US008380999B1

(12) United States Patent
Robison et al.

(10) Patent No.: US 8,380,999 B1
(45) Date of Patent: Feb. 19, 2013

(54) POWER MANAGEMENT FOR ELECTRONIC DEVICES

(75) Inventors: Keela N. Robison, Seattle, WA (US); Ian W. Freed, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 241 days.

(21) Appl. No.: 12/973,847

(22) Filed: Dec. 20, 2010

(51) Int. Cl.
*H04M 1/18* (2006.01)

(52) U.S. Cl. ........ 713/300; 713/310; 713/320; 713/321; 713/322; 713/323; 713/324; 713/330; 713/340; 320/120; 455/572; 455/574

(58) Field of Classification Search .................. 713/300, 713/310, 320–324, 330, 340; 455/574, 572; 375/219; 320/120
See application file for complete search history.

(56) References Cited

U.S. PATENT DOCUMENTS

| 6,363,266 | B1 * | 3/2002 | Nonogaki ........ 455/572 |
| 7,246,249 | B2 * | 7/2007 | Shiiyama ........ 713/320 |
| 7,389,439 | B2 * | 6/2008 | Yoon et al. ........ 713/323 |
| 8,135,443 | B2 * | 3/2012 | Aleksic et al. ........ 455/574 |
| 2005/0077872 | A1 * | 4/2005 | Single ........ 320/114 |
| 2008/0057894 | A1 * | 3/2008 | Aleksic et al. ........ 455/187.1 |
| 2010/0233989 | A1 * | 9/2010 | Constien et al. ........ 455/343.1 |
| 2011/0111799 | A1 * | 5/2011 | Kothari et al. ........ 455/556.2 |

* cited by examiner

*Primary Examiner* — M Elamin
(74) *Attorney, Agent, or Firm* — Novak Druce Connolly Bove + Quigg LLP

(57) ABSTRACT

An electronic user device can provide intelligent power management. The device can monitor information such as charge level and rate of power consumption, and determine an appropriate time to charge the device. If a device is placed on a charger at a time when the device does not require charging, and the charging could potentially shorten the life of the device battery, the device might activate an internal switch or communicate with the charger to prevent the device from being charged. The device can be configured to notify the user when the device should be charged using any number of notification approaches. If the device is unable to be charged during a certain period, or the rate of power consumption exceeds at least one set value, the device can adjust functionality of various components and/or applications in order to conserve power until the device is able to be charged.

25 Claims, 5 Drawing Sheets

- Front -   - Back -

|  | 0-4 | 4-8 | 8-12 | 12-4 | 4-8 | 8-12 |
|---|---|---|---|---|---|---|
| Monday | 5% | 10% | 15% | 20% | 25% | 10% |
| Tuesday | 5% | 10% | 15% | 20% | 25% | 10% |
| Wednesday | 5% | 10% | 15% | 20% | 25% | 10% |
| Thursday | 5% | 10% | 15% | 20% | 25% | 10% |
| Friday | 10% | 15% | 15% | 15% | 25% | 20% |
| Saturday | 10% | 15% | 15% | 15% | 25% | 20% |
| Sunday | 5% | 10% | 10% | 10% | 10% | 5% |

POWER MANAGEMENT FOR ELECTRONIC DEVICES

BACKGROUND

People are utilizing portable electronic devices for an increasing number and variety of tasks. It is not uncommon for a user to have a personal media player, notebook computer, cell phone, and electronic book reader, among other such devices. Further, the demands on these devices increase as the devices offer enhanced functionality. For example, a tablet computer or portable gaming platform might perform most, if not all, of the tasks performed by the devices above. Thus, the amount of resource and power consumption required by these devices tends to increase, along with the need for the devices to have sufficient power for a user to utilize the devices as necessary.

In many instances a user will forget to charge a device overnight, which results in the device losing power the next day. For tasks that rely upon these devices, not being able to utilize the device when needed can be at least inconvenient to the user. Even in cases where devices provide some indication of low battery power, the devices typically only provide a notification when the device is very low on power, which may be of little use if the user is not near a location where the device can be charged, or if the user is not near the device when the low power indication initiates. Further, even when users do remember to charge the device every evening, for example, the consistent amount of "trickle" charging can shorten battery life, which can be particularly problematic for devices that do not utilize replaceable batteries.

BRIEF DESCRIPTION OF THE DRAWINGS

Various embodiments in accordance with the present disclosure will be described with reference to the drawings, in which.

DETAILED DESCRIPTION

Figure 1:
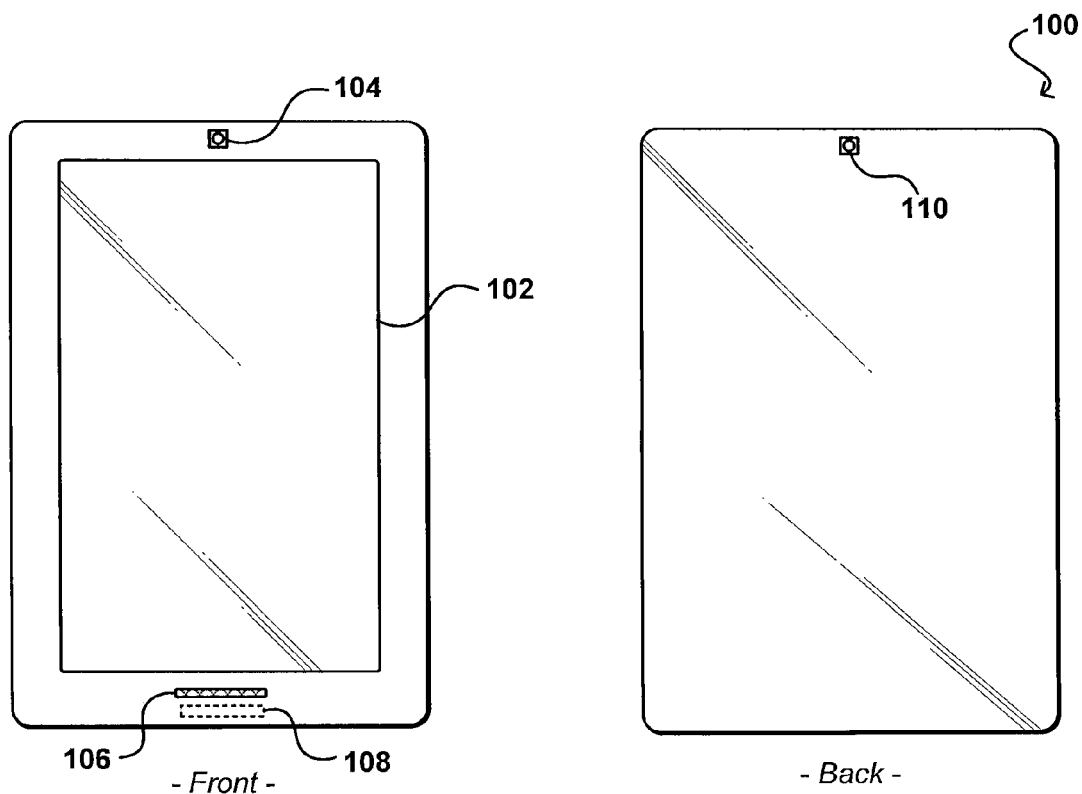
FIG. 1 illustrates front and back views of an example electronic device that can be used in accordance with various embodiments.

Systems and methods in accordance with various embodiments of the present disclosure overcome one or more of the above-referenced and other deficiencies in conventional approaches to managing power for an electronic device. In particular, an electronic device can be configured to monitor information about a device, such as the current power level and rate of power consumption, to determine an appropriate time to charge a device. The device can prevent unnecessary charging, which can shorten battery life, and can notify the user when the device should be charged to prevent the device from losing power, as may be based on predicted usage or other such information. When a device is unable to be charged for a certain period of time, when the rate of power consumption exceeds a specified rate, or when another such criteria are met, the device can cause the functionality of at least one application, module, process, or other such component of the device to be modified, in order to reduce power consumption.

In some embodiments, an electronic device is able to predict whether that device is likely to run out of power before a next charging opportunity. For example, the device might be able to determine that the user is on the subway and will not be home for another 45 minutes, with the device having an estimated 30 minutes of power left at the current rate of power consumption. In such a situation, the device can be configured to, either automatically or upon user confirmation, adjust the functionality of the device in order to conserve power until such time as the device is able to be charged.

Such determinations can also be based at least in part upon information such as user behavior, schedule information, behavioral data, and other such information. For example, if the user is scheduled to drive to a four hour meeting in one hour, and the device will not run out of power in the next hour, a determination might be made to wait until the user is in the car to charge the device. If the user does not have the ability to charge the device in the car, however, a recommendation might be made to charge the device before leaving. If the user always checks messages or browses the Internet at a certain time of day, which increases the rate of power consumption for a relatively consistent period of time, the device can anticipate this increase and adjust any predictions or determinations accordingly. If one user places a heavier drain on a device than another user, that information can be factored in as well based at least in part upon the current user.

As discussed, similar predictions can be used to prevent the device from being charged when charging is not likely needed at the present time. For example, if it is determined that the device is unlikely to lose charge in the next 24 hours, the device might not accept or recommend a charging until the next day. Even when the electronic device is placed in a charging or docking station overnight, for example, the station might not charge the device in order to preserve battery life of the device. In embodiments where the station always provides charge to a device placed in the station, the device can have the ability to accept or reject charge from the station.

In some embodiments, the device and/or a charger or docking station can communicate with a system or service over an appropriate network, such as the Internet, in order to enable at least a portion of the processing, predictions, and various other such determinations to be done remotely. Such an approach can reduce the amount of resources, power, and processing needed on those components, which can help to lower the cost of the components and enable upgrades and other adjustments to be made without user interaction.

A user device can notify a user when the device should be charged, when the rate of power consumption exceeds a certain value, or when any of a number of other such criteria are met. The notification can be any appropriate type of device-based notification, such as a series of beeps, a flashing light, or a screen message. In other embodiments, the device can emit computer-generated speech to provide specific notifications or information, or can send messages such as email, text, or instant messages to addresses that the user can receive on other devices. In some embodiments, a device can be configured to send notifications to other users, devices, systems, or other entities capable of causing the device to be charged, or notifying the user to charge the device. Various other types of notification and approaches can be used as well within the scope of the various embodiments.

FIG. 1 illustrates front and back views, respectively, of an example electronic user device 100 that can be used in accordance with various embodiments. Although a portable computing device (e.g., an electronic book reader or tablet computer) is shown, it should be understood that any electronic device capable of receiving and processing input, or at least capable of communicating and/or being charged, can be used in accordance with various embodiments discussed herein, where the devices can include, for example, desktop computers, notebook computers, personal data assistants, smart phones, video gaming consoles, television set top boxes, and portable media players. In this example, the user device 100 has a display screen 102 on the front side, which under normal operation will display information to a user facing the display screen (e.g., on the same side of the computing device as the display screen). The computing device in this example includes at least one front image capture element 104 and at least one back image capture element 110 positioned on the device such that, with sufficient lenses and/or optics, the user device 100 is able to capture image information in substantially any direction about the computing device. The example user device 100 also includes at least one microphone 106 or other audio capture device capable of capturing audio data, such as words spoken by a user of the device.

The example user device 100 also includes at least one position and/or orientation determining element 108. Such an element can include, for example, an accelerometer or gyroscope operable to detect an orientation and/or change in orientation of the user device 100. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 2:
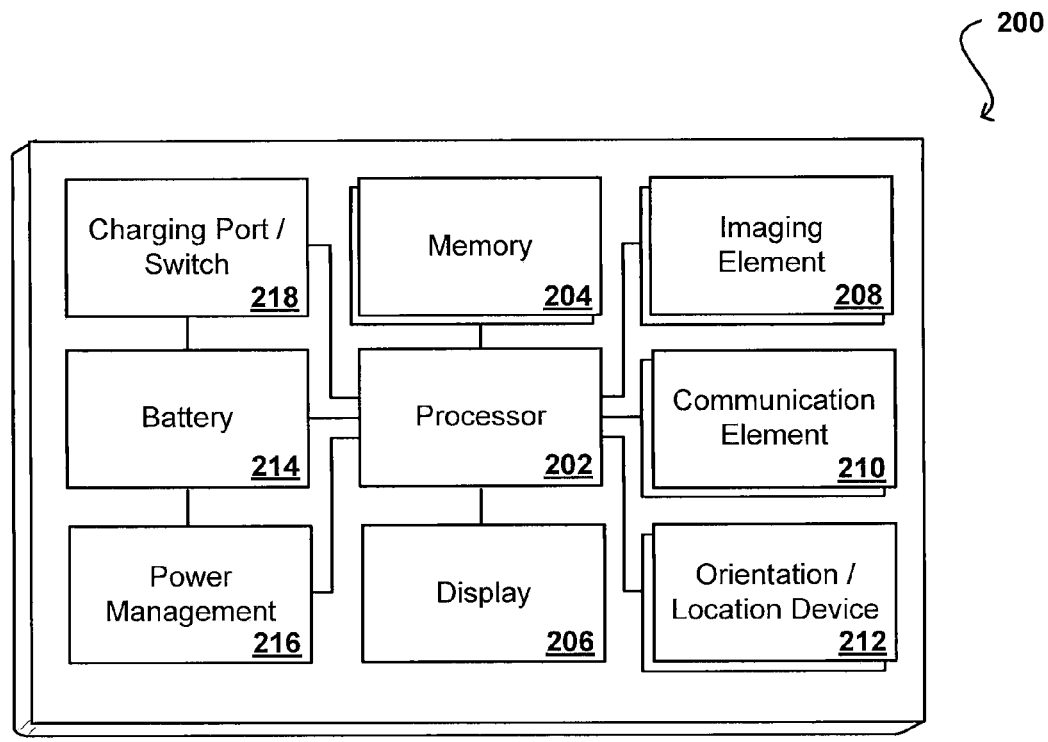
FIG. 2 illustrates example components of an example electronic device that can be used in accordance with various embodiments.

FIG. 2 illustrates a logical arrangement of a set of general components of an example computing device 200 such as the user device 100 described with respect to FIG. 1. In this example, the device includes a processor 202 for executing instructions that can be stored in a memory device or element 204. As would be apparent to one of ordinary skill in the art, the device can include many types of memory, data storage, or non-transitory computer-readable storage media, such as a first data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. As discussed, the device in many embodiments will include at least one image capture element 208 such as a camera or infrared sensor that is able to objects in the vicinity of the device. It should be understood that image capture can be performed using a single image, multiple images, periodic imaging, continuous image capturing, image streaming, etc. Further, a device can include the ability to start and/or stop image capture, such as when receiving a command from a user, application, or other device. The device also can include one or more orientation and/or location determining elements 212, such as an accelerometer, gyroscope, electronic compass, or GPS device as discussed above. These elements can be in communication with the processor in order to provide the processor with positioning and/or orientation data.

In some embodiments, the computing device 200 of FIG. 2 can include one or more sideband or other such communication elements (not shown), such as a Wi-Fi, Bluetooth, RF, or another wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The example device 200 also includes a battery 214 or other appropriate power source. The power source can include, for example, at least one rechargeable battery, and can include other elements as well such as solar power cells or other such elements. The device also can include an intelligent charging port or switch 218, in at least some embodiments, which is controllable by the processor 202. The device might be plugged into an outlet or placed into a charging station, for example, but in at least some embodiments the charging switch 218 can control whether or not power is actually passed on to the battery for purposes of charging. For example, if the battery has almost no remaining charge then the switch might close in order to allow power to charge the battery, while in the case of a battery 214 that is nearly fully charged the charging switch 218 might open such that no charge passes to the battery at the current time. In some embodiments, the user can override such settings, whereby the device might always accept a charge or only accept a charge upon certain user settings, etc.

An example device also can include at least one power management module or component 216, which can be software and/or hardware in communication with, or executed by, at least one processor 202 of the device 200. In at least some embodiments, the power management module 216 can monitor aspects such as the remaining amount of charge on the battery 214, the current power usage rate of the device and/or any individual components (e.g., the display screen or a communications channel), etc. In some embodiments, the power management module also can send instructions to the various components to alter operation or functionality based at least in part upon one of the monitored power values. For example, if the device is not moving and the power consumption exceeds a desired rate, the power management module 216 might send a command to a location determining device 212, such as a GPS device, to power down or at least stop attempting to determine current position information. If the device has an accelerometer, for example, the accelerometer can determine when the device is moved more than a certain amount, at which time the power management module (or another such module or component of the device) might cause the GPS device to re-activate. Such an approach can be used to adjust the functionality of any appropriate component or process as discussed or suggested herein for purposes of power or resource savings and management, etc.

In addition to monitoring aspects such as power level and usage rates, for example, it can be beneficial to also track this information over time and be able to predict future usage. For example, instead of waiting until the device hits 10% of full charge remaining (or some other such static threshold) and then enabling charging of the device, it can be beneficial to determine when the device is likely to run out of charge, and then make charging decisions based on that information. For some devices, not charging the device until there is only 10% charge left can cause the device to frequently run out of power when the device might use on the order of 10% an hour. Similarly, a different device, or a different user of the same device, might use the device very little, such that charging at 10% would cause the device to be charged more than is necessary.

Accordingly, user devices (or systems or services in communication with those devices) in accordance with various embodiments can monitor device usage patterns, as well as device states, levels, and other such values, to attempt to predict when a user device should be charged. Further, if a user device is unable to be charged for any particular reason, such as the device being away from a charger or a charger currently being used to charge at least one other device, the user device can adjust certain functionality in order to conserve power, or at least to utilize power where it is needed most. While various determinations will be discussed with respect to the user device alone, it should be understood that the determinations could be made by another device, or a system or service in communication with the user device. In some cases, a charger also can be used as part of the charging determination process. For example, a user device can be placed in a docking station with a built-in charging mechanism whether or not the device needs charging. The docking station can communicate with the user device to determine when or whether the user device should be charged, and can charge accordingly. In other embodiments, a docking station or charger might always apply a charge to a device when connected properly, but the device might not accept the charge as may be due to an internal switch, port state, etc.

A variety of approaches and/or processes can be used within the scope of the various embodiments to determine when to optimally charge a device. For example, a device might look at the behavioral data, historical data, schedule, or other such information to determine how much power the user is likely to use before the next opportunity to charge. Another algorithm might look at these and/or other types of data to attempt to determine a likelihood that the device will run out of power before the next opportunity to charge. Other approaches might use various thresholds, percentages, set values, or any other appropriate mechanism to attempt to determine when to charge a device. In some cases, a docking station or charger could communicate with the user device to determine whether to charge the device. In other cases, a charger could instead request information from the device, or a system in communication with the device, and make the determination. In other cases, the user device can contact the charger when the device determines it should be charged. If the user device is not in a location where the device can be charged, such as positioned in a docking station or placed upon a capacitive charger, the user device can provide a notification to the user that the device should be charged, such as by emitting a beep or specific tone, or using generated speech to say to the user "please recharge the device" or something similar. In alternative embodiments, the charger or another device could display or emit a similar notification. Texts, pages, messages, or other such notifications can be used as well as discussed elsewhere herein, as may be configurable by the user.

In situations where a user might have multiple devices, or where a device is used by different users, there can be different charging windows or approaches used for each device and/or user. For example, certain devices might be used every day, or might have significantly higher rates of usage. Other devices might be used by different users, who have significantly different usage patterns. Still other devices might only be brought for charging periodically, instead of substantially every day. A user device can have different approaches available, and can analyze the results over time in order to select an approach that provides the best results for each specific user or device.

Devices in accordance with various embodiments can also monitor various other types of information as well. For example, a device can adjust power usage predictions over time, as the power needed for a certain type of activity might change based on upgrades, different software versions, decreased component efficiency, etc. Further, the device can monitor the actual current battery capacity, accounting for the fact that batteries often lose maximum charging capacity over time. If the device's battery is swapped out, the maximum charge value can be reset and/or determined otherwise determined for the new battery.

The windows or predictions can vary for the same user and device, based upon factors such as time of day or day of the week. In one embodiment, a user device can track the usage of that device by a user over a number of time periods, such as is shown in the example table 300 of FIG. 3. In this example, the device calculates and tracks average usage over a range of time periods for each day of the week. Tracking at various time periods throughout a day in this example enables smaller windows to be used at night, when the usage is lower and the device will be less likely to run out of power for a given value, and larger windows to be used during the day, when the device usage is higher and it might be important to charge the device even when there is still a substantial amount of charge on the device. Further, the average usage during these periods also can vary between different days of the week. For example, as can be seen in the example chart 300 the device gets less usage on Sunday, and more usage in the early morning hours of Friday and Saturday, than for the same periods other days of the week.

Figures 3, 4:
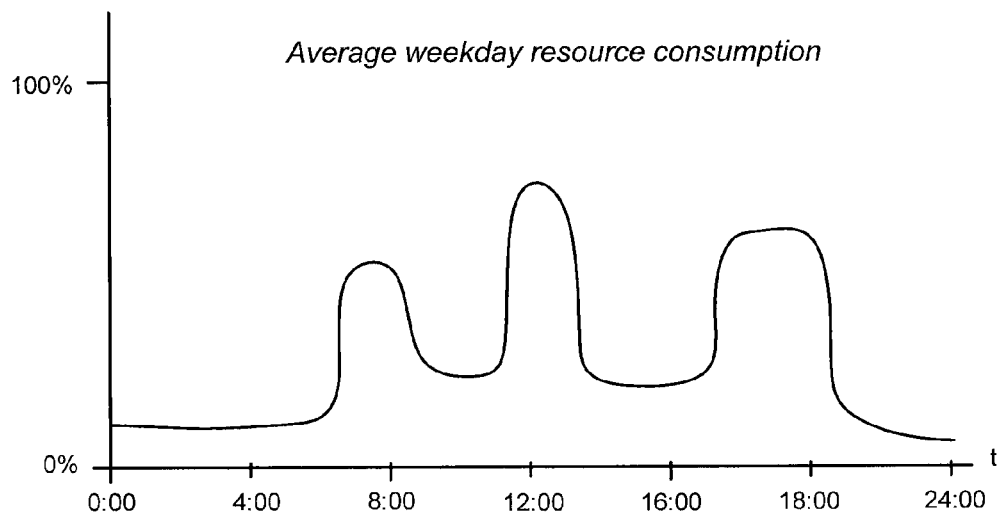
FIG. 3 illustrates an example usage table for a user of an electronic device that can be used in accordance with various embodiments.
FIG. 4 illustrates an example curve indicating average daily usage of an electronic device that can be used in accordance with various embodiments.

Instead of a chart or set of periods of averages, a device can utilize a more granular approach, such as by generating and updating at least one usage graph 400 such as that illustrated in FIG. 4. In this example, data can be captured and maintained (for at least a period of time) for a user and/or device, and at least one curve-fitting algorithm can be applied to the data points in order to attempt to generate an accurate representation of the predicted usage at any point in time. For example, the table of FIG. 3 used four-hours windows, but gave no insight as to whether the usage was equally distributed or weighted towards one side of that window. By applying a curve fit or other such process, the device (or a system or service, etc.) can make a better determination of the amount of power that will likely be consumed over any subsequent period of time. In this graph 400, the points on the graph represent the predicted amount or rate of power consumption at a particular point in time. If the device determines, based on a schedule or behavior, for example, that a user will not be able to charge the device for the next eight hours, the device can determine the anticipated power usage over that time, which can correspond to the area under the curve over that range of time. If the amount of power to likely be consumed is equal to or greater than the amount of charge in the device, then the device can determine that the device should likely be charged before the user leaves. A user (or other entity) also can configure a threshold or range, such that if a user is likely to come within an amount (e.g., 10%) of the low end of the power range before the next opportunity to charge, the device can recommend to the user to charge the device. The device in some embodiments can also track ranges of deviation of usage, for example, to determine a charge window based on the heaviest usage over a given period, etc. Many other such approaches can be used as well within the scope of the various embodiments.

If a user device has access to information such as a GPS and a calendar for a user, for example, various other determinations can be made as well. For example, if the user is scheduled to be in his office for the next four hours, then drive to a remote location that will bring the device near the end of its charge, a determination can be made that the user should charge the device while in the office. The device can generate (or otherwise cause) an appropriate notification for the user, such as to make an audible sound and display a message or perform another notification as discussed elsewhere herein. If, on the other hand, the user would be driving straight home and/or will not be in the office long enough to get a full charge on the device, a determination might be made to wait until the user gets home to recommend charging the device. If available, the device could recommend that the user charge the device while in the car on the way to the remote location. Various other options exist as well as should be apparent in light of the present disclosure.

In one specific example, a user might typically plug in a device by 11:00 p.m. on weekdays. If the device, or a docking station used to charge the device, for example, detects that the device has not been plugged in by 11:00 on a weekday, a notification might be generated for the user, or at least a determination made as to the likely amount of charge left on the device. If it is determined that the charge on the device will likely not last another 24 hours, and the user likely will not charge the device until 11:00 the next night based on historical or behavioral data, the device and/or charger can go into notification mode using any appropriate process or technique discussed elsewhere herein.

In another specific example, the device might utilize calendar or schedule information to determine that the user is likely on a flight. The device can use other information as well, such as being connected to a Wi-Fi network associated with an airline or otherwise obtaining information indicating the user is on a plane. If the battery is draining at a high rate due to the device not being switched off or not at least placed in "plane" mode, such that the device is continually searching for a signal, the device can disable the signal search or temporarily go into plane mode (or a similar mode) until around such time that the flight is scheduled to be over, the user is no longer connected to the network, or other information is obtained being indicative of the flight being substantially over. In some cases, in order to ensure compliance with federal regulations, the device might not switch out of plane mode until a user manually activates the device or a notification is received that the device is able to search for a signal, etc.

In some embodiments, it may be desirable to limit the predictions or behavior analysis in order to conserve resources. Accordingly, there can be certain thresholds or other values set that must be met before such analysis will begin. For example, the device might not analyze user behavior for that device with several days worth of charge until the device gets to less than 30% of a full charge. For devices with shorter battery life, the threshold can be any appropriate threshold, such as 50% or 75%. For these devices, determinations might be made for any value of remaining charge, but might do so at a lower rate or frequency than for other devices. Other resource-conserving options can be used as well.

As discussed, a device might determine that the device is likely to run out of charge before the user has an opportunity to charge the device. Is such an instance, a determination can be made to begin adjusting the performance of the device in an attempt to reduce power consumption, and thus attempt to lengthen the period during which the device has a charge. For example, the electronic device might determine, based on GPS or similar data, that the device is a distance from home that will likely cause the device to run out of power at current usage rates before the user is able to again charge the device. Other examples can produce similar determinations, such as where the device is able to determine that the user will be in meetings for the next several hours, the user has to run an errand across town, the user is watching a video that still has over an hour of time left, etc. In at least some embodiments, a device can include many different types of functionality that can be adjusted to conserve power, and can have a priority list, ranking, or other indication of which functionality to adjust at which time, which may be configurable by the user. For example, each entry can have a threshold, rate, or other state value that determines when a device should adjust that functionality, and in some cases can have multiple actions to take for multiple values (i.e., reduce functionality for a first threshold and terminate functionality for a second threshold). Functionality also can be adjusted based on other reasons as well, such as time since last use, distance of the user, current function or setting, etc. In any such situation, the user device (or other device, system, or service in communication with the user device) can determine that the user device is likely to run low on power before the next opportunity to charge. In certain embodiments, the user device can notify the user that the device is running low on power, such that the user can change the usage (e.g., stop watching the video) in order to conserve power.

A user device can cause a user to be notified in any of a number of different ways. For example, the device can emit a sound or series of beeps, display a message on a screen, flash a light, or perform another such action (or combination of actions). The sound, number of beeps or flashes, or various other aspects can vary based upon current state, values, settings, or other such information. For example, a device might emit a single beep to notify the user that the device is getting low on charge, or the user might otherwise want to charge the device for any of the reasons discussed or suggested herein. As the device gets lower on power, the device might emit more beeps at any given time, might increase the frequency or volume of the beeps, or might emit a different type of beep. If the device flashes a light, such as an LED, the frequency or number of flashes can vary as well, while in some embodiments the color can vary with changes in power usage or state. For example, a light might flash green when it is acceptable, but not necessary, to charge the device. The light might shift to yellow as the device gets to a point where it is advisable to charge the device, and go towards red when the device needs to be charged to prevent loss of utility. It should be understood that any similar approach can be used as well within the scope of the various embodiments.

In some embodiments, the device might utilize computer-generated speech to notify the user of a suggested action. For example, the device might cause a "speech" notification such as "please charge your device" to be generated when the user device reaches a certain state. If the user is using the device, such as by talking into a phone or reading a book on an e-book reader, the device might use another approach, such as vibrating or flashing a message in order to minimize the distraction to the user. In some embodiments, a user device will only emit a spoken request when the user is not actively using the device, is determined to not be within a certain distance of the device, or meets some other such criterion. The user device can provide other spoken notifications as well, such as when functionality is reduced or operation is modified as a result of power consumption or any other such reason. The types of notification and times for generating such notification can be user configurable in at least some embodiments. Further, notification such as speech notification can be utilized selectively based upon factors such as location or time of day. For example, if the user is determined to be in a library or on a train, the user device might not provide a "spoken" (or other audible) notification. Similarly, if the user typically sleeps during the night, the device might not emit spoken or audible notifications during the times in which the user is typically sleeping, as may be based upon monitored or historical information, unless the user is detected to be awake and/or active.

In some embodiments, a user device can be configured to generate other types of notifications as well. For example, the device can send an email message, page, instant message, or text message to a particular device, address, or number associated with the user. In some embodiments, the type of notification can depend upon a detected action by the user, such as a user being logged into a particular device or actively using a particular device, which then can be designated to receive the notification. In other embodiments, the user device can begin sending notifications to various devices associated with the user or otherwise nearby, particularly as the need to charge the device increases. For example, the device can contact each device associated with the user when the remaining charge reaches a certain level, either in parallel or one at a time until the device is charged. In other embodiments, the user device might attempt to contact nearby devices, such as televisions or gaming consoles, in an attempt to notify the user. In still other embodiments, a user device can contact devices associated with others, such as friends or family members of the user, to ask that those persons either plug in the device or ask the user to plug in the device. A device can alternatively send email messages or other such notification to those persons, who might be designated by the user or otherwise identified by the device.

A device can be configured to communicate with, or otherwise notify, a user for any of a number of other such reasons as well. For example, the device might determine that the device is on or near the docking station or charger, or is at least partially plugged in, but for some reason is not getting a charge. Such a situation could happen, for example, when the device is not placed correctly in a docking station, the power cord is not pushed fully into the device, the docking station or other end of the cord is not plugged in, or for any other appropriate reason. If the device determines that the user likely intended to charge the device, but the device is not getting a charge, the device can notify the user. A different type of message or notification can be used in such a situation than would be used for normal device charging suggestions.

In at least some embodiments, it can be desirable to minimize the annoyance or distraction of the user due to notifications from, or about, a given device. For example, if a user device is able to determine that the user likely cannot currently charge the device based on the location or current task, then there may be little benefit to indicating to the user that the user should charge the device at the present time. In such an instance, it may be preferable to wait until the user is home, in the car, or at another location where the user can actually charge the device. In other cases, the device might notify the user once while the user is away from a charging location, and not bother the user again until the user is able to charge the device. Even when at the charging location, the device might only notify the user a limited number of times that the device needs to be charged, in order to minimize annoyance or distraction that might otherwise be caused by repeated notifications. In some embodiments, the device, and/or charger can work together to only charge the device when needed. In such embodiments, the user might only be notified when the device is away from home longer than predicted, usage is higher, or another situation occurs where the device is not able to be charged as anticipated.

When the device is likely unable to be charged for at least a certain period of time, the battery charge meets a low charge threshold, or the device is otherwise predicted to likely run low on power, the device can analyze the current usage of the device to attempt to determine if the current rate of consumption can be reduced. For example, if the device is an electronic book reader or smart phone that periodically searches for a signal, the device might be able to reduce the frequency of that search, or even stop the search at certain power levels or during certain activities. If the user is watching a movie on a tablet computer then the device can determine that the user is unlikely to download content during the movie, and can potentially turn off the cellular connection. Similarly, the device can shut off a wireless or Bluetooth connection, periodically check the connection, or otherwise adjust wireless operation. If the user is sitting in one location for a period of time, the device can shut off the GPS data determinations at least until the user moves the device a given distance, such as may be determined by an accelerometer. If the user is reading an electronic book, the device might turn off the accelerometer, electronic compass, etc. If the device determines that the user is not looking at it, the device might turn off the display, GPS, etc.

Various other adjustments can be made as well. For example, the device can stop automatically attempting to pull email, texts, tweets, or other such content. The device can attempt to lower brightness of a display screen, resolution of displayed video, quality of generated audio, etc. The device also can close any application that is executing in the background but that has not been accessed for a period of time. For example, if the user has an instant messaging application open but has not accessed that application while reading a book or watching a movie, the device can shut down the instant messaging application. These determinations in some embodiments are assisted by utilizing user configuration, personalization, historical, or behavioral data, for example. In some embodiments, a user can specify which applications can be shut down. In some embodiments, a device can look at user behavior data to determine which applications a user is likely to access during a particular task, and can shut down or adjust behavior of the applications that are unlikely to be accessed. In the case of an application whose behavior has been modified, such as by switching an email program from an automatic push/pull to a manual push/pull, the user can receive a notification that the change has been made, and can have the option of canceling the change or reverting back at any time.

In some embodiments, the device might combine such adjustments with charging determinations. For example, a user might set down the device after coming home in the evening, and the device determines (through behavior, schedule, etc.) that the user is unlikely to use the device again until the next morning. If the device determines that the device does not yet need to be charged, the device can attempt to reduce power consumption, such as by shutting down applications or performing any other action as discussed or suggested above. When the device gets to a point where it needs to be charged to be ready in the morning, the device notify the user to come get the device for charging. By first adjusting the usage, the device can reduce power consumption which can lower energy costs for the user, and can also drain the battery further before charging, which can potentially extend the life of the battery in at least some embodiments. Similarly, when a user is determined to be away from the device, such as by detecting the user in a remote location or being unable to locate the user via audio or video analysis, for example, the device might adjust functionality to reduce power consumption, etc.

Similarly, when the user device is substantially fully charged the application of charge can be stopped, such as by a charger no longer applying charge. In other embodiments, such as where the device is plugged directly into a power outlet, a switch or port on the device can cause the device to no longer receive power from the outlet. Even when the device is not fully charged, a switch, port, or similar component of the device can prevent the device from receiving a charge, or at least manage the time, amount, and or rate of charge that the device receives. In some embodiments, a user might plug a device into a power outlet when the user comes home at night, and the user might unplug the device in the morning, but the device might actually have not received any charge overnight due to the power management module or similar component of the device. In order to further conserve power, the device can go into an adjusted state while charging, or being in a position or location to be charged, until the device is picked up or otherwise activated for normal operation. If there are more devices to be charged than there are power outlets or charging stations, for example, the devices could notify the user(s) as to a priority or rotation to be used to charge the devices. The devices waiting for their turn in the rotation can modify power consumption as discussed herein to prevent that device from losing power when it is not yet able to be charged.

Figure 5:
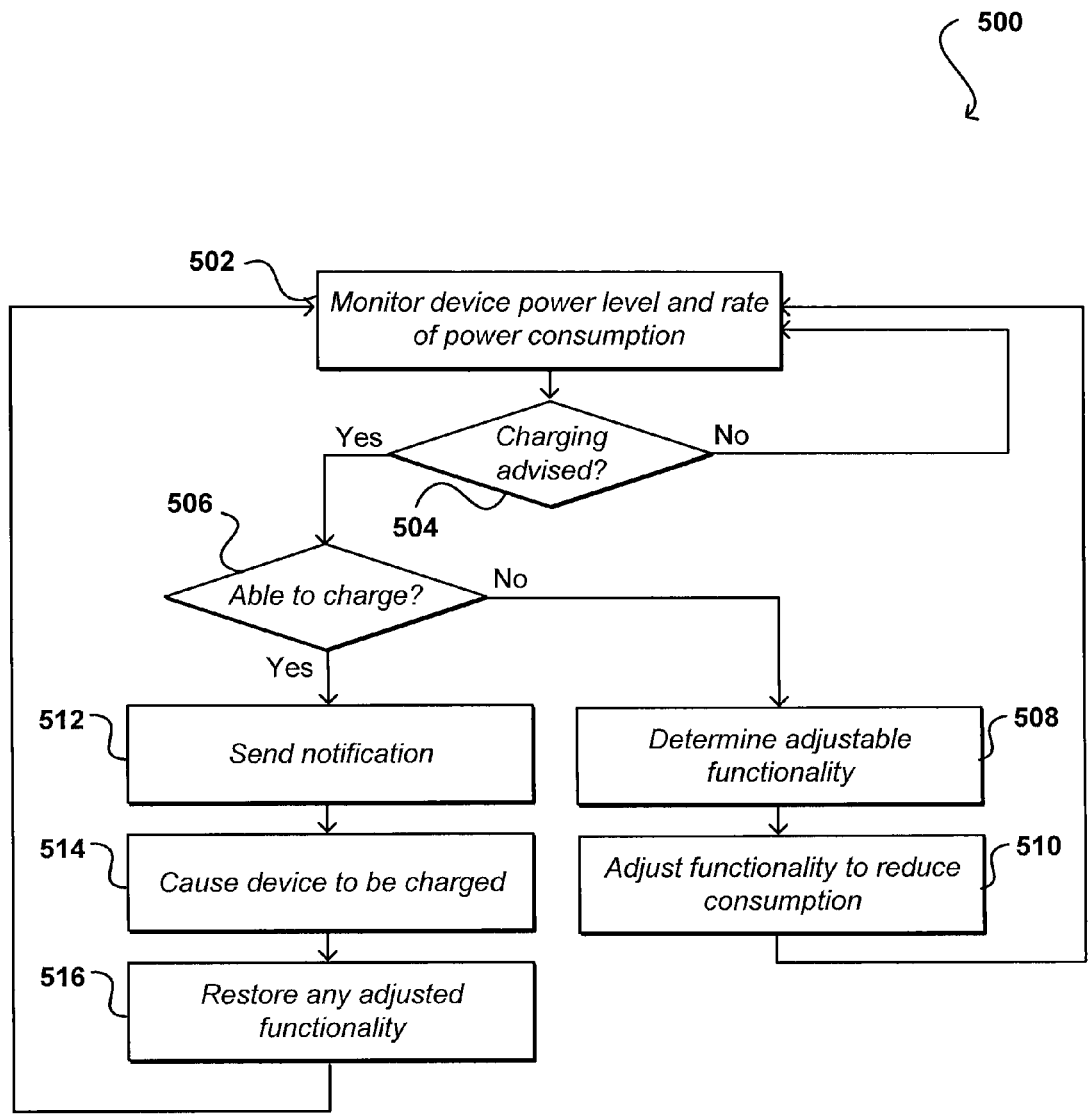
FIG. 5 illustrates an example process for intelligent reduction in power consumption that can be used in accordance with various embodiments.

FIG. 5 illustrates an example process 500 for performing intelligent power management that can be used in accordance with various embodiments. While in this example the electronic device is performing much of the analysis, it should be understood that a docking station, charger, other device, and/or remote system or service could be performing at least a portion of the analysis in other embodiments. In this example, the device monitors one or more power-related aspects of the device 502, such as may include the current amount of charge or power level of the device, the current rate of usage, the predicted time until charging is needed, the power consumption of each application or module, etc. Using the monitored information along with any other appropriate information such as current user, historical usage, behavioral data, location data, calendar data, and/or other data discussed herein, the device can determine whether it is advisable to charge the device at the present time and/or within a certain amount of time 504, where the charging might be advisable to prevent a predicted loss of power, enable the device to continue to operate at the current level, enable certain functionality, etc. If charging is not necessary or advisable at the current time, or in the near future, for example, the device can continue normal operation and monitor the power level, consumption rate, and other such information. If it is advisable to charge the device within a certain period of time, a determination can be made (by the device or another entity or component) as to whether can the device is able to be charged within that time period 506. In some embodiments, this determination can be made based upon information such as a current geographical position, ability for a user to obtain the device, and other factors discussed herein. The determination also can include a likelihood that the device will be able to be charged during that period, as may be based upon schedule or behavior information, for example. If the device is likely unable to be charged within a determined period of time, the device (or another component) can analyze current usage, open programs, configuration, and other such information to attempt to determine functionality that can be adjusted in order to reduce power consumption 508. As discussed, this can include terminating applications, reducing the frequency of certain operations, changing a mode of various operations, etc. The determination also can take into account specific preferences set by the user, such as functionality that should not be adjusted, should only be adjusted when necessary, should only be adjusted in a certain order, or can be adjusted at any time. Based at least in part on the potential adjustments, the device can make any adjustments appropriate to be made to the functionality at the current time 510. For example, there might be five adjustments that can be made, but if one adjustment is to a relatively low priority function, or otherwise will not substantially affect the operation of the device, the device might adjust only that function at an initial adjustment time. The device can continue to monitor the power usage, charge level, rate of consumption, and other such information, and can make additional adjustments as appropriate. In some embodiments, certain adjustments are only made as a last resort when power will likely be lost within a relatively short period of time if the adjustment is not made. In other embodiments, any or all of the available adjustments can be made at any time in order to conserve power.

When the device is likely able to be charged within the determined period, the device can send a notification to the user to charge the device 512. This notification can take the form of a message or notification to the user to place the device in a position from which the device can be charged, or an electronic communication to a charger that a connected device should be charged, for example. The device then can be charged 514, such as by the docking station applying power and a switch or port of the device enabling that power to charge an internal battery or other such power component. After the device is charged and/or during the charging process, any functionality that was adjusted to conserve power can be reverted or restored to the prior state of operations 516. The device can then continue to operate in a normal state, monitoring power information as discussed above.

Figure 6:
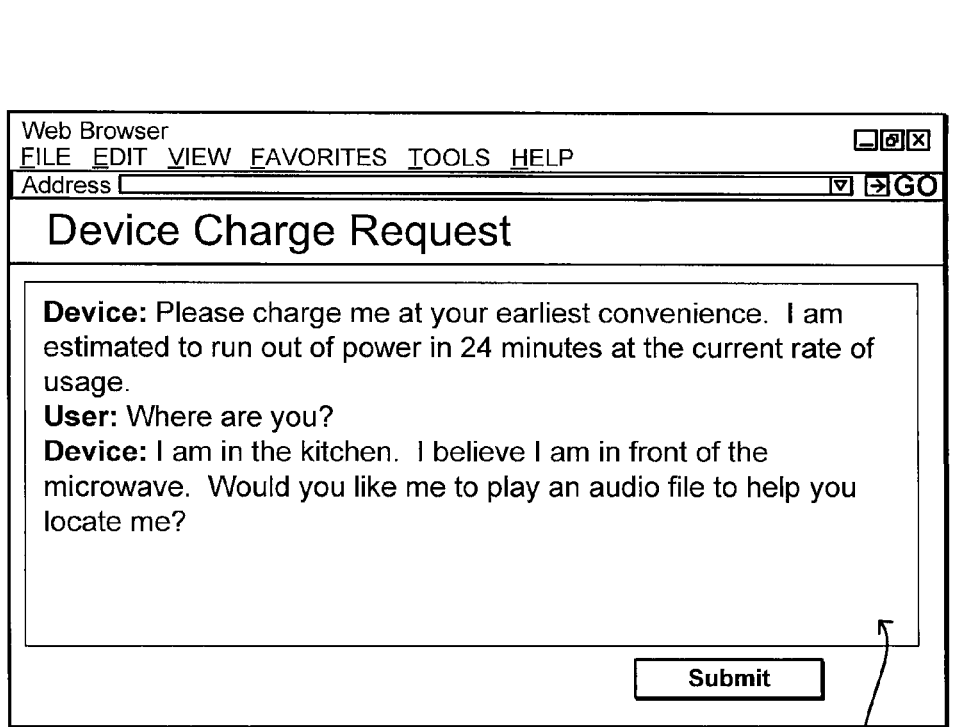
FIG. 6 illustrates an example communication interface that can be used in accordance with various embodiments.

As discussed, a user device can send any of a number of different types of notification. In at least some embodiments a user can communicate with a device to obtain additional information, provide instructions, etc. For example, FIG. 6 illustrates an example interface 600 which can be accessed on a device other than the user device. In this example the interface is a Web page that can be accessed from any device, component, or system operable to download and render a Web page. The communication 602 can be in the form of a chat, instant message, or other such format. In this example, a device has contacted the user to request that the user charge the user device. In response, the user has asked for the current location of the user device. The device can respond with general information based on GPS data or other such information, such as to provide an approximate location such as "in the kitchen." In at least some embodiments where image or other information can be obtained and analyzed as well, the device might be able to provide more detailed information, such as being "in front of the microwave" or near another recognizable object. In this example, the device also asks the user whether the user device should emit a sound in order to assist the user in finding the device in the kitchen. Any appropriate communications can be utilized as well within the scope of the various embodiments. As should be understood, similar conversations can be conducted through an interface on the user device itself.

Such an interface also enables a user to communicate with the user device for reasons other than charge levels or power consumption. For example, if the user is unable to locate the user device, the user can send a request through the interface on any appropriate device such as, "Where are you?" and the user device can respond with its approximate location (as much as can be determined). Similarly the user can send other commands as well, such as to set an alarm, move a calendar entry, add a contact, etc.

Figure 7:
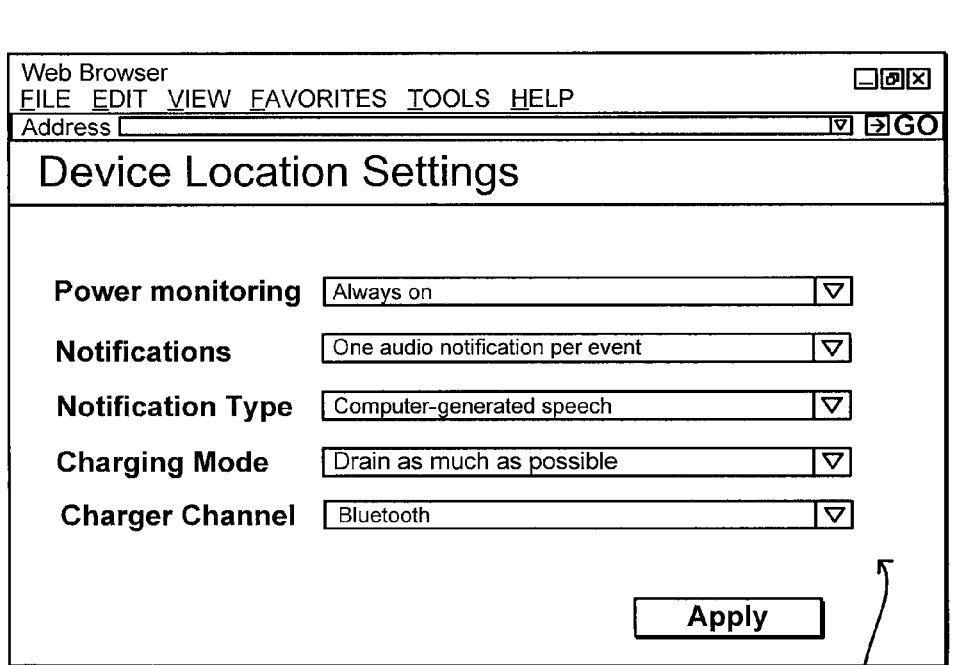
FIG. 7 illustrates an example configuration interface that can be used in accordance with various embodiments.

As discussed, a user can have the ability to configure various aspects of the operation of a user device, charger, or other such component, object, or system within the scope of the various embodiments. FIG. 7 illustrates an example interface 700 that can enable a user to perform such configuration through a variety of configurable options 702. While a set is shown for purposes of explanation, it should be understood that there can be any of a number of options and combinations as discussed elsewhere herein. Further, while in this example the options are presented as drop-down boxes, it should be understood that any other appropriate elements such as radio buttons, checkboxes, text boxes, or other such interface elements can be used as well within the scope of the various embodiments. In the example options displayed, a user is able to specify the when the power monitoring and adjustment analysis is to be performed, such as "always on" or "only when the power reaches a certain level," in order to conserve resources. A user also can specify a frequency of notification, as well as a type of notification. The user can specify a charging mode or approach, such as a mode that charges as often as needed to prevent a loss of power or a mode that drains the charge as much as possible to conserve battery life. The device also can configure communication bands or channels to use to connect to other devices, such as a charger or docking station, as may depend upon factors such as whether the user has a wireless network available or whether the user receives a strong cellular signal at that location. Any of a number of other options and values can be used as well within the scope of the various embodiments.

Figure 8:
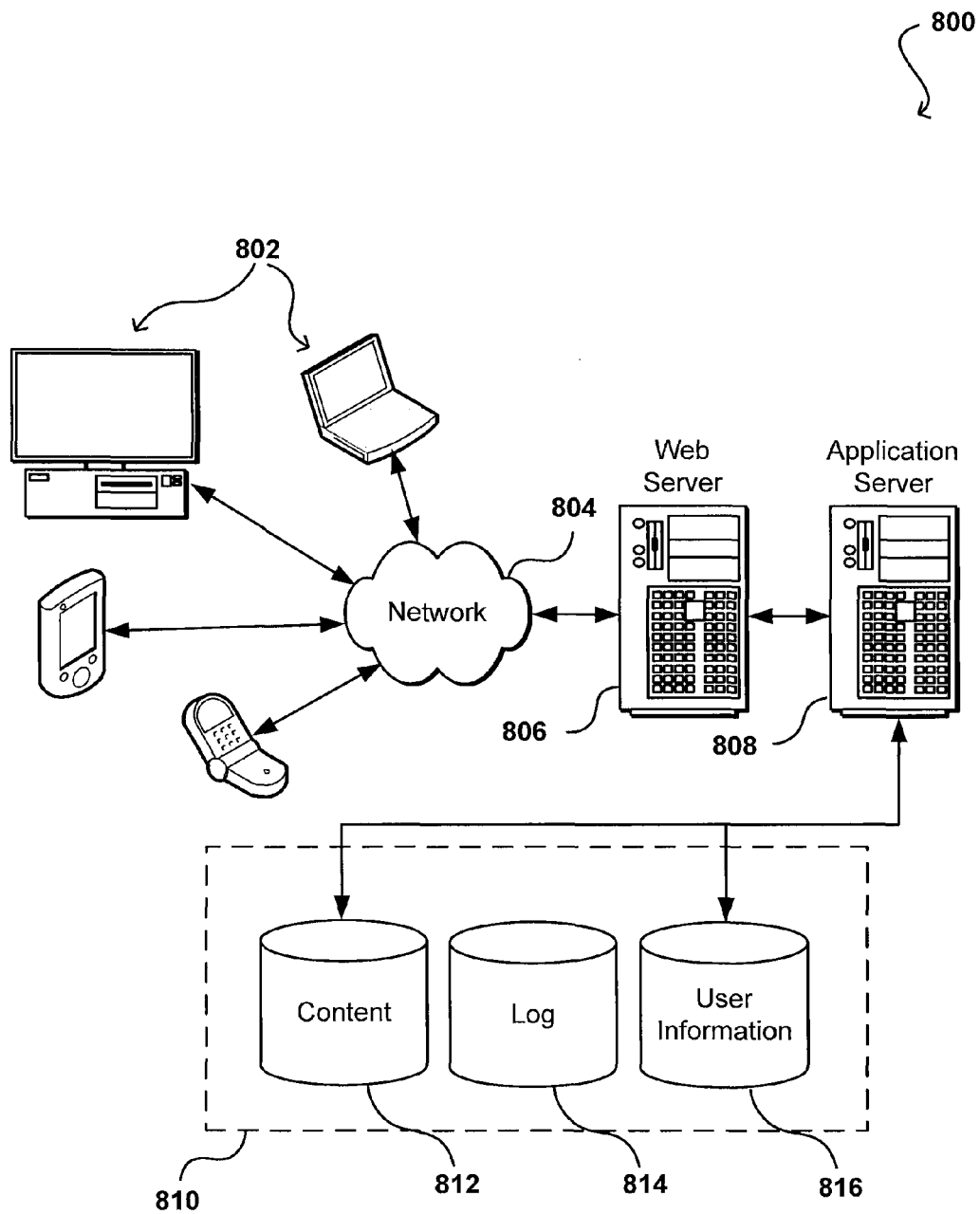
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network also can communicate with devices such as a charger (not shown), as discussed herein. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing power on an electronic device, comprising:
   determining, using a power level determination component of the electronic device, a current power level and a rate of power consumption of the electronic device;
   predicting, based at least in part upon the current power level and using a processor of the electronic device, an amount of power consumption for the electronic device over a determined period of time;
   determining, based at least in part upon the predicted amount of power consumption and using a processor of the electronic device, whether the electronic device should be charged within a present period of time; and
   if the electronic device should be charged within the present period time:
      determining whether the electronic device is able to be charged within the present period of time;
      if the electronic device is able to be charged within the present period of time, generating a notification indicating to charge the electronic device; and
      if the electronic device is not able to be charged within the present period of time, adjusting functionality of the electronic device in order to reduce the rate of power consumption until at least such time as the electronic device is able to be charged.

2. The method of claim 1, wherein predicting the amount of power consumption for the electronic device over the determined period of time further comprises analyzing at least one of behavioral information for a current user of the electronic device, functionality currently executing on the electronic device, schedule information for the current user, a current location of the electronic device, and historical usage data for the electronic device.

3. The method of claim 1, wherein the notification is generated for at least one of a current user, another device, a component capable of charging the electronic device, and another user.

4. A computer-implemented method of managing power on an electronic device, comprising:
   under control of one or more computing systems configured with executable instructions,
      determining power information including at least one of a current power level and a current rate of power consumption of the electronic device;
      determining, based at least in part upon the determined power information, whether the determined power information meets at least one of a first criterion or a second criterion for the device;
      when the determined power information at least meets the first criterion, generating a notification that the electronic device should be charged; and
      when the determined power information at least meets the second criterion, causing functionality of the electronic device to be adjusted to reduce a rate of power consumption on the electronic device until at least such time as the electronic device is able to be charged.

5. The computer-implemented method of claim 4, wherein the notification includes information causing a charging device to charge the electronic device.

6. The computer-implemented method of claim 4, wherein the notification is one of an audible or a visual message generated to notify a nearby person that the electronic device should be charged.

7. The computer-implemented method of claim 4, wherein the notification is a message generated for a user of the electronic device, or a person or other device associated with the user or electronic device, indicating that the electronic device should be charged.

8. The computer-implemented method of claim 4, wherein determining whether the determined power information meets at least one of a first criterion or a second criterion for the device includes predicting an amount of power consumption for the electronic device over a determined period of time.

9. The computer-implemented method of claim 8, wherein predicting an amount of power consumption is further based at least in part upon at least one of behavioral information for a user of the electronic device, functionality currently executing on the electronic device, schedule information for the user, a current location of the electronic device, and historical usage data for the electronic device.

10. The computer-implemented method of claim 4, wherein causing functionality of the electronic device to be adjusted includes at least one of terminating an application, adjusting a frequency of an operation, and adjusting functionality of at least one component of the electronic device.

11. The computer-implemented method of claim 4, further comprising, when the determined power information does not meet at least one of a first criterion or a second criterion for the device, predicting an appropriate future time to charge the electronic device and generating a notification regarding the predicted future time.

12. The computer-implemented method of claim 4, wherein the first criterion includes at least one of the electronic device having less than a first specified amount of remaining charge, having at least a minimum rate of power consumption, and the device being likely to run out of charge if not charged within a specific period of time.

13. The computer-implemented method of claim 4, wherein the second criterion includes at least one of the electronic device having less than a second specified amount of remaining charge, and the device not being able to be charged within a specific period of time.

14. The computer-implemented method of claim 4, further comprising:
   generating a notification if the electronic device is physically or capacitively coupled with a charging mechanism but not receiving a charge.

15. The computer-implemented method of claim 4, further comprising:
   managing a state of a power accepting mechanism of the electronic device whereby the electronic device is operable to selectively accept power from a charging device.

16. An electronic device, comprising:
   a processor;
   a power storage element; and
   memory including instructions that, when executed by the processor, cause the electronic device to:
      determine at least one of a current power level of the power storage element and a current rate of power consumption of the electronic device;
      predict, based at least in part upon the current power level or current rate of power consumption, an amount of power consumption for the electronic device over a determined period of time;
      determine, based at least in part upon the predicted amount of power consumption, whether the electronic device should be charged within a future period of time; and
      when the electronic device should be charged within the future period of time, generating a notification to cause the electronic device to be charged; and when the electronic device is not able to be charged within that future period of time, adjusting functionality of the electronic device to reduce a rate of power consumption.

17. The electronic device of claim 16, wherein predicting the amount of power consumption for the electronic device over a determined period of time is further based at least in part upon at least one of behavioral information for a user of the electronic device, functionality currently executing on the electronic device, schedule information for the user, a current location of the electronic device, and historical usage data for the electronic device.

18. The electronic device of claim 16, wherein the notification includes at least one of information causing a charging device to charge the electronic device, an audible or a visual message generated to notify a nearby person that the electronic device should be charged, or a message generated for a user of the electronic device, or a person or other device associated with the user or electronic device, indicating that the electronic device should be charged.

19. The electronic device of claim 16, wherein causing functionality of the electronic device to be adjusted includes at least one of terminating an application, adjusting a frequency of an operation, and adjusting functionality of at least one component of the electronic device.

20. The electronic device of claim 16, further comprising:
a power accepting mechanism having a state controllable by the processor to selectively accept power from a charging device.

21. A non-transitory computer-readable storage medium including instructions that, when executed by a processor, cause the processor to:
determine power information including at least one of a current power level and a current rate of power consumption of an electronic device;
determine, based at least in part upon the determined power information, whether the determined power information meets at least one of a first criterion or a second criterion for the device;

when the determined power information at least meets the first criterion, generate a notification that the electronic device should be charged; and when the determined power information at least meets the second criterion, cause functionality of the electronic device to be adjusted to reduce a rate of power consumption on the electronic device until at least such time as the electronic device is able to be charged.

22. The non-transitory computer-readable storage medium of claim 21, wherein the notification includes at least one of information causing a charging device to charge the electronic device, an audible or a visual message generated to notify a nearby person that the electronic device should be charged, or a message generated for a user of the electronic device, or a person or other device associated with the user or electronic device, indicating that the electronic device should be charged.

23. The non-transitory computer-readable storage medium of claim 21, wherein determining whether the determined power information meets at least one of a first criterion or a second criterion for the device includes predicting an amount of power consumption for the electronic device over a determined period of time.

24. The non-transitory computer-readable storage medium of claim 21, wherein predicting an amount of power consumption is further based at least in part upon at least one of behavioral information for a user of the electronic device, functionality currently executing on the electronic device, schedule information for the user, a current location of the electronic device, and historical usage data for the electronic device.

25. The non-transitory computer-readable storage medium of claim 21, wherein causing functionality of the electronic device to be adjusted includes at least one of terminating an application, adjusting a frequency of an operation, and adjusting functionality of at least one component of the electronic device.

\* \* \* \* \*